(12) United States Patent
Crowley

(10) Patent No.: US 11,802,955 B2
(45) Date of Patent: Oct. 31, 2023

(54) DIVERSITY FIN ANTENNA

(71) Applicant: RF VENUE, INC., Ashland, MA (US)

(72) Inventor: Robert J. Crowley, Sudbury, MA (US)

(73) Assignee: RF VENUE, INC., Walpole, MA (US)

(*) Notice: Subject to any disclaimer, the term of this patent is extended or adjusted under 35 U.S.C. 154(b) by 550 days.

(21) Appl. No.: 17/120,635

(22) Filed: Dec. 14, 2020

(65) Prior Publication Data

US 2021/0181334 A1 Jun. 17, 2021

Related U.S. Application Data

(63) Continuation of application No. 15/727,506, filed on Oct. 6, 2017, now abandoned.

(51) Int. Cl.

| | | |
|---|---|---|
| *G01S 13/87* | (2006.01) | |
| *H01Q 1/08* | (2006.01) | |
| *H01Q 9/40* | (2006.01) | |
| *H01Q 11/10* | (2006.01) | |
| *H01Q 21/28* | (2006.01) | |
| *H01Q 23/00* | (2006.01) | |
| *H01Q 25/00* | (2006.01) | |
| *H04B 10/2575* | (2013.01) | |
| *G01S 13/00* | (2006.01) | |

(52) U.S. Cl.
CPC ............ *G01S 13/87* (2013.01); *H01Q 1/084* (2013.01); *H01Q 9/40* (2013.01); *H01Q 11/105* (2013.01); *H01Q 21/28* (2013.01); *H01Q 23/00* (2013.01); *H01Q 25/001* (2013.01); *H04B 10/25759* (2013.01); *H01Q 1/088* (2013.01)

(58) Field of Classification Search
None
See application file for complete search history.

(56) References Cited

U.S. PATENT DOCUMENTS

| | | | | |
|---|---|---|---|---|
| 4,621,282 A | * | 11/1986 | Ahern | H04N 7/22 725/144 |
| 4,723,321 A | * | 2/1988 | Saleh | H04B 7/10 455/60 |
| 5,377,035 A | * | 12/1994 | Wang | H04B 10/532 379/56.2 |
| 5,752,180 A | * | 5/1998 | Guo | H03B 5/1876 455/333 |

(Continued)

FOREIGN PATENT DOCUMENTS

| | | | | |
|---|---|---|---|---|
| GB | 2385750 A | * | 8/2003 | H04B 7/10 |
| JP | 2003163634 A | * | 6/2003 | H04B 10/22 |

*Primary Examiner* — Bernarr E Gregory
(74) *Attorney, Agent, or Firm* — KRIEGSMAN & KRIEGSMAN

(57) ABSTRACT

A fin-type planar antenna and a deployable dipole antenna are combined into a probabilistic system as a co-located orthogonal diversity fin antenna to reduce or eliminate cross polarization fades and cancellation dropouts common to wireless audio systems used in theaters, churches and convention centers over coaxial wired connections. Additionally, an optical line may connect the diversity fin antenna to a further circuit. The antenna system features broad bandwidth, resistance to deep nulls or fades caused by cross polarization, resistance to destructive interference, and an air space dielectric covering provides resistance to detuning in the presence of rain, or touching objects.

16 Claims, 15 Drawing Sheets

(56) References Cited

U.S. PATENT DOCUMENTS

| | | | | |
|---|---|---|---|---|
| 5,896,211 A * | 4/1999 | Watanabe | ............ | H04B 10/504 398/187 |
| 6,169,888 B1 * | 1/2001 | Lindenmeier | .......... | H01Q 21/28 455/272 |
| 6,268,946 B1 * | 7/2001 | Larkin | ............. | H04B 10/25758 375/219 |
| 7,466,082 B1 * | 12/2008 | Snyder | ................... | H05B 45/38 315/307 |
| 2002/0114038 A1 * | 8/2002 | Arnon | ................ | H04B 10/1125 379/56.1 |
| 2006/0239630 A1 * | 10/2006 | Hase | ................ | H04B 10/25759 385/147 |
| 2008/0081567 A1 * | 4/2008 | Rofougaran | ............. | H04B 7/10 455/562.1 |
| 2012/0032861 A1 * | 2/2012 | Crowley | ............. | H01Q 11/105 29/600 |

* cited by examiner

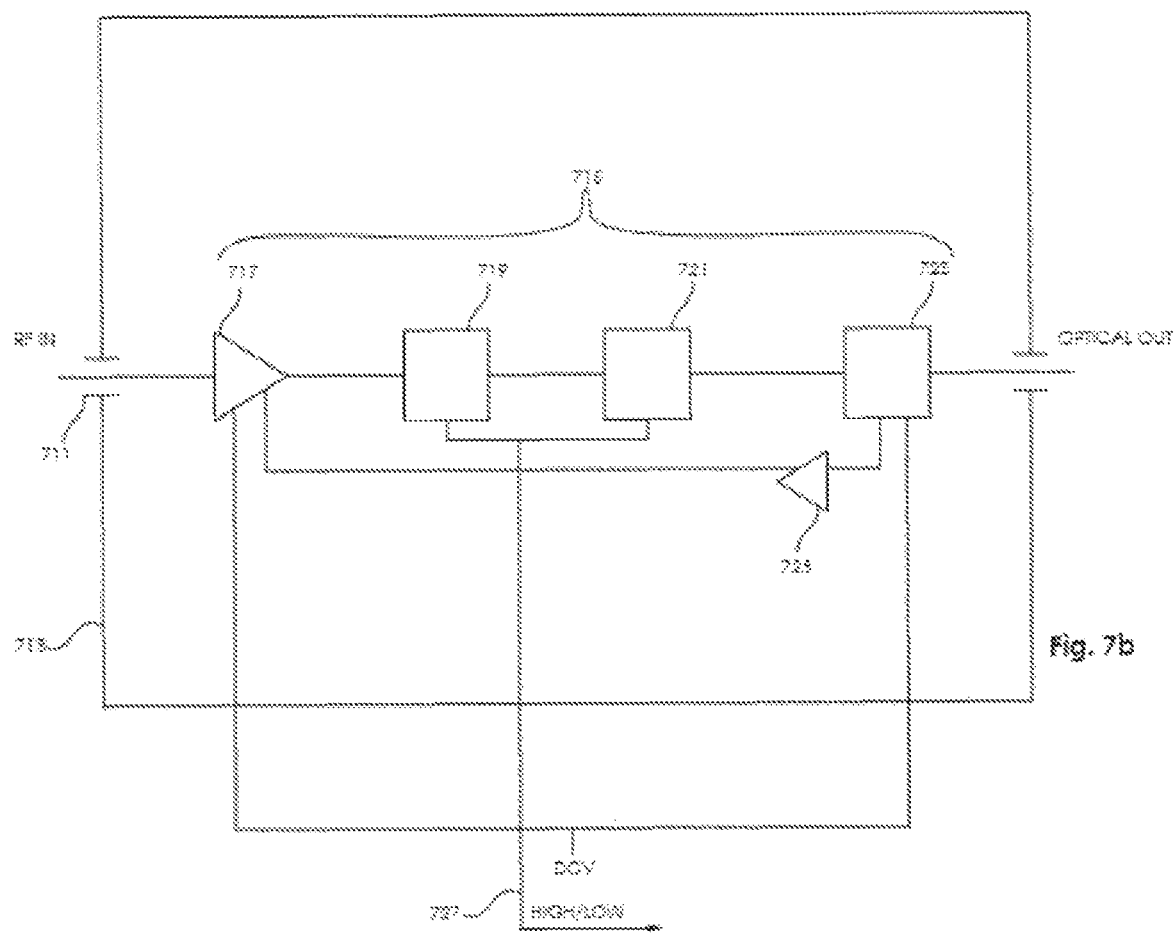

DIVERSITY FIN ANTENNA

CROSS-REFERENCE TO RELATED APPLICATIONS

The present application is a continuation of presently U.S. patent application Ser. No. 15/727,506, filed Oct. 6, 2017, now abandoned the disclosure of which is incorporated herein by reference.

TECHNICAL FIELD

The techniques relate to antenna systems, and more particularly to an antenna system which consists of a probabilistic orthogonal antenna assembly connected in a relatively fixed arrangement to reduce the likelihood of any signal dropout likelihood, and associated electronics systems that regulate gain, antenna selection, up conversion, downconversion, demodulation, modulation and transmission over radio frequency (RF) and fiber optic lines.

BACKGROUND

Fin-type antennas employing log periodic dipole arrays and other arrangements of antenna conductors are commonly used for indoor and outdoor reception and transmission of short range wireless signals and particularly so-called wireless audio devices that are used in performance, stage, sports events, houses-of-worship, and in convention halls. The typical prior art fin type antenna is a planar sheet of dielectric material with conductors thereon, and at least one connection point for a coaxial cable. These fin type antennas are capable of operation over a broad bandwidth of 400 MHz to 3000 MHz or greater, and more typically operate over a one or two octave range of 400-1000 MHz, and exhibit forward gain of about 6 dB or more over the entire operating range. Forward gain is a function of the directionality of the antenna. These antennas are linearly polarized, that is, they pick up or transmit RF energy on a single plane, usually a vertical plane. Wireless devices used in conjunction with typical planar antennas comprise wireless body packs, wireless transducers and microphones of various types, and wireless musical instrument pickups. Wireless monitoring receivers worn by users on stage are included in this group. These wireless devices are typically equipped with linearly polarized antennas, that is, they tend to emit or receive RF energy with a single polarization that is dependent upon the angular position of the device. Because they are linearly polarized, a common problem in operation is a fading or reduction of signal strength when the position of the device results in a crossed polarization of the respective transmitting and receiving antennas. This phenomenon is well known and appreciated in the antenna art. To overcome this problem, which results in an unacceptable noise (white noise) in the received audio, designers have constructed so-called diversity-receive-systems that use a plurality of antennas spaced apart and at different angles, in hope of reducing the probability of an extreme cross polarization fade. The diversity systems use two receivers in one box, typically, with two antenna ports that are to be connected to two feed lines, and then to two antennas. The two antennas can be of various types, most commonly used becoming the so-called shark fin, or blade antenna named for its flat, fin like shape. These antennas are produced economically by etching printed circuit board materials but have a disadvantage that they may be detuned, reducing effectiveness, when wet with rainwater. Prior art diversity systems are generally considered to be effective but have the limitations of requiring two antenna setups that may or may not represent true polarization diversity. In other words, even though the visual angle of any two antennas used in such a diversity system may appear to be significantly different and presumably picking up on multiple axes, they may not be in reality due to the vagaries of RF propagation and reflection within buildings and close to reflecting objects such as stage equipment, and other metallic objects nearby. Persons who set up antennas for stage use must experiment with locations and guess at the required position and orientation of two or more antennas used for a single channel, which takes time and is subject to error. In addition the use of two separate antennas often requires the use of two stands that clutter the area, and two divergent feed lines, often coaxial cables, which must be separately routed back to the receiver that has two antenna ports. The cables have to be routed on the floor and usually require taping down for safety.

SUMMARY

It would be especially desirable if optical rather than coaxial lines could be used in certain circumstances for connection to a distant receiver system, and even more desirable if that optical connection could be over a single fiber line.

In some embodiments, the techniques include an antenna system designed to reduce a probability of destructive interference of signals received by the antenna system. The antenna system includes a first linearly polarized antenna oriented to detect energy along a first plane, a second linearly polarized antenna oriented to detect energy along a second plane, wherein the second antenna is positioned generally perpendicular to the first antenna and affixed thereto such that the first plane is cross-polarized with the second plane, and the first antenna exhibits a first gain and the second antenna exhibits a second gain that is different from the first gain, wherein the different first gain and second gain reduce a probability of destructive interference of the signals arriving at the antenna system.

In some examples, the second antenna is affixed to the first antenna using a removable connection so that the second antenna can be removably coupled to the first antenna.

In some examples, the antenna system includes a circuit co-located upon at least one portion of the first or second antenna, wherein the circuit is active. The circuit can include one or more optical connections, each of the one or more optical connections configured to communicate with an associated optical line. The circuit can include a converter comprising one or more hardware elements configured to generate an optical signal based on an analog signal associated with the first antenna, the second antenna, or both. The antenna system can include a first converter for the first antenna configured to generate a first optical signal based on a first analog signal associated with the first antenna, and a second converter for the second antenna configured to generate a second optical signal based on a second analog signal associated with the second antenna.

In some embodiments, the one or more hardware elements of the converter include an RF amplifier that amplifies the analog signal, a laser diode that generates the optical signal, and a feedback amplifier configured to sense a condition of the laser diode, and to provide feedback to the RF amplifier to control a range of the RF amplifier to within an acceptable operating range.

In some embodiments, the one or more hardware elements of the converter include a first receiving path for receiving an analog signal from the first antenna, the receiving path comprising a first mixer, a second receiving path for receiving an analog signal from the second antenna, the second receiving path comprising a second mixer, and an oscillator connected to the first mixer and the second mixer.

In some embodiments, the techniques include a diversity antenna system including a first antenna associated with a first channel, a second antenna associated with a second channel that is configured to operate in a diversity mode with the first antenna, and each of the first and second channels comprising a radio frequency (RF) to optical converter locally attached thereto, wherein each optical converter transmits information from the associated antenna. The optical converter can be an all-analog heterodyne type converter.

In some embodiments, the techniques include an analog radio frequency (RF) to optical converter system, which includes a first converter associated with at least two channels configured to up convert, down convert, or both, a signal from each channel to generate a converted signal, a transmitter configured to transmit the converted signal over an optical line in communication with the transmitter, a detector in communication with the optical line configured to detect the converted signal from the optical line, and a second converter configured to convert the converted signal back into the signal in its original form.

The conversion scheme executed by the first converter and the second converter can be a heterodyne scheme operating in a range around 400 to 600 MHz.

In some embodiments, the techniques include a method of reducing a probability of destructive interference of signals received by an antenna system, the method including arranging, for the antenna system a first linearly polarized antenna oriented to detect energy along a first plane, and a second linearly polarized antenna oriented to detect energy along a second plane, such that the second antenna is positioned generally perpendicular to the first antenna and affixed thereto such that the first plane is cross-polarized with the second plane, wherein the first antenna exhibits a first gain and the second antenna exhibits a second gain that is different from the first gain, wherein the different first gain and second gain reduce a probability of destructive interference of the signals arriving at the antenna system.

In some examples, the method includes affixing the second antenna to the first antenna using a removable connection so that the second antenna can be removably coupled to the first antenna.

In some examples, the method includes co-locating a circuit upon at least one portion of the first or second antenna, wherein the circuit is active. The circuit can include one or more optical connections, each of the one or more optical connections configured to communicate with an associated optical line. The circuit can include a converter comprising one or more hardware elements, and the method can further include generating an optical signal based on an analog signal associated with the first antenna, the second antenna, or both.

In some examples, the method includes generating, by a first converter for the first antenna, a first optical signal based on a first analog signal associated with the first antenna, and generating, by a second converter for the second antenna, a second optical signal based on a second analog signal associated with the second antenna.

In some examples, the method includes amplifying, by an RF amplifier, the analog signal, generating, by a laser diode, the optical signal, sensing, by a feedback amplifier, a condition of the laser diode, and providing, by the feedback amplifier, feedback to the RF amplifier to control a range of the RF amplifier to within an acceptable operating range. In some examples, the one or more hardware elements of the converter include a first receiving path for receiving an analog signal from the first antenna, the receiving path comprising a first mixer, a second receiving path for receiving an analog signal from the second antenna, the second receiving path comprising a second mixer, and an oscillator connected to the first mixer and the second mixer.

These and other capabilities of the embodiments will be more fully understood after a review of the following figures, detailed description, and claims. It is to be understood that the phraseology and terminology employed herein are for the purpose of description and should not be regarded as limiting.

BRIEF DESCRIPTION OF THE DRAWINGS

Various objectives, features, and advantages of the embodiments can be more fully appreciated with reference to the following detailed description of the embodiments when considered in connection with the following drawings, in which like reference numerals identify like elements.

FIG. 7b is a more detailed block diagram of the RF over fiber system with feedback and inline filtering.

DETAILED DESCRIPTION

In the following description, numerous specific details are set forth regarding the systems and methods of the embodiments and the environment in which such systems and methods may operate, etc., in order to provide a thorough understanding of the embodiments. It will be apparent to one skilled in the art, however, that the embodiments may be practiced without such specific details, and that certain features, which are well known in the art, are not described in detail in order to avoid unnecessary complication of the embodiments. In addition, it will be understood that the embodiments provided below are exemplary, and that it is contemplated that there are other systems and methods that are within the scope of the embodiments.

Figure 1:
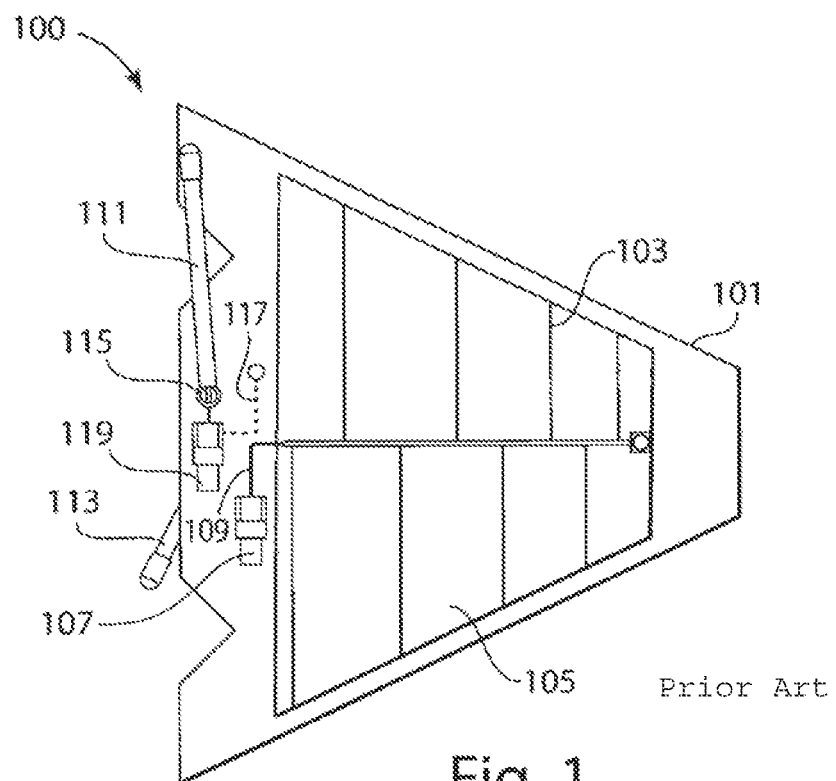
FIG. 1 is a side view of a diversity fin antenna with folded whip elements.

Referring to the drawings in detail, and particularly to FIG. 1, there is shown a side view of a diversity fin antenna 100 with folded whip elements, with a substrate panel 101 which may be comprised of epoxy fiberglass material commonly known as "FR4" which is typically used for printed circuit board applications. Panel 101 is a sandwiched or clad material having copper layers upon dielectric layer(s) that are etched into a pattern or circuit. The particular pattern or circuit can form an antenna patch 103 that may have various shapes, including the shape of a tapered antenna, more commonly known as a log periodic dipole array or LPDA. Elements 105 in patch 103 may be comprised of lines and various shapes that connect to feed line 109 that is further communicates a radio frequency (RF) signal to connector 107. Elements 105 are conductors that are excited by external RF fields, and exhibit directional characteristics, and are polarized with respect to the RF field. Shown here in FIG. 1 is a "vertical" arrangement of antenna elements 105 that are best at picking up RF signals that are also vertically polarized. Still referring to FIG. 1, second whip antennas 111 and 113 are connected through separate circuit 117 that is independent of connector 107 but instead communicates through connector 119. Connector 119 can be a panel mount "BNC" type connector. Whip antennas 111 and 113 may be equipped with pivoting joints 115 to allow for the articulation of antennas 111 and 113. An example of a diversity fin antenna is that described in U.S. Pat. No. 8,836,593, entitled "Diversity Fin Antenna," which is hereby incorporated by reference herein in its entirety.

Figure 2:
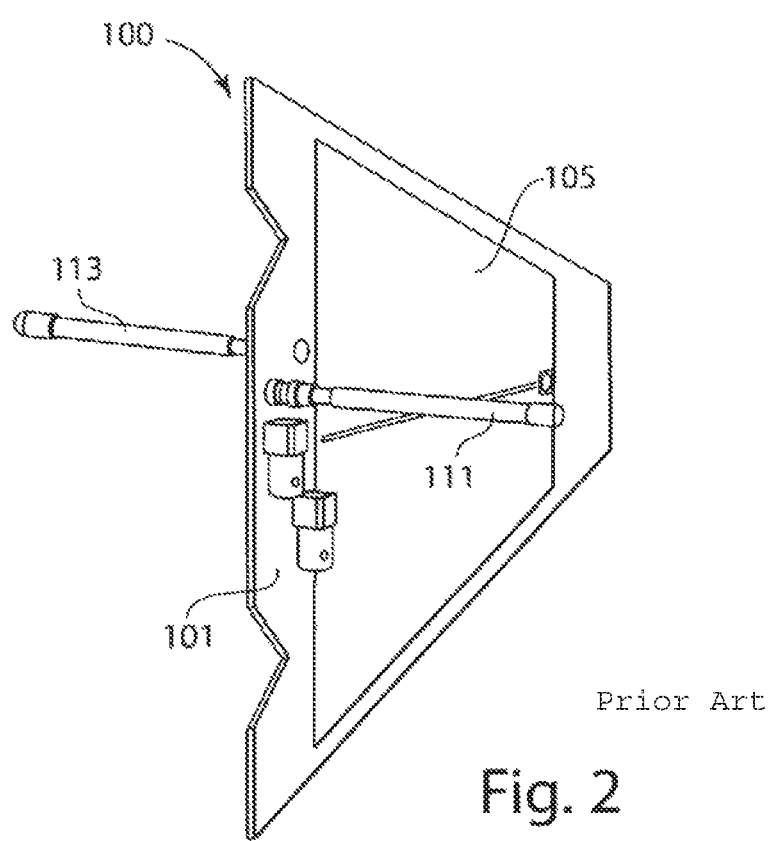
FIG. 2 is a ¾ view of a diversity fin antenna with extended whip elements.

Referring now to FIG. 2, the ¾ view of a diversity fin antenna 100 with extended whip 10 elements, extended whips 111 and 113 can be seen deployed at a more or less right angle to the plane of the substrate panel 101. It can be readily appreciated that extended whips 111 and 113 are polarized at or about 90 degrees from the previously called vertical arrangement of antenna elements 105. Thus, whips 111 and 113 may be thought of as being horizontally polarized, or better able to pick up RF signals that are also horizontally polarized. Extending elements in perpendicular orientation is also desirable for the purpose of maintaining normal operation of the antenna patch 103 without disturbance from the second antenna whips 111 and 113, as the RF coupling between cross polarized elements is minimal thereby allowing them to operate independently yet in close proximity to each other.

Figure 3:
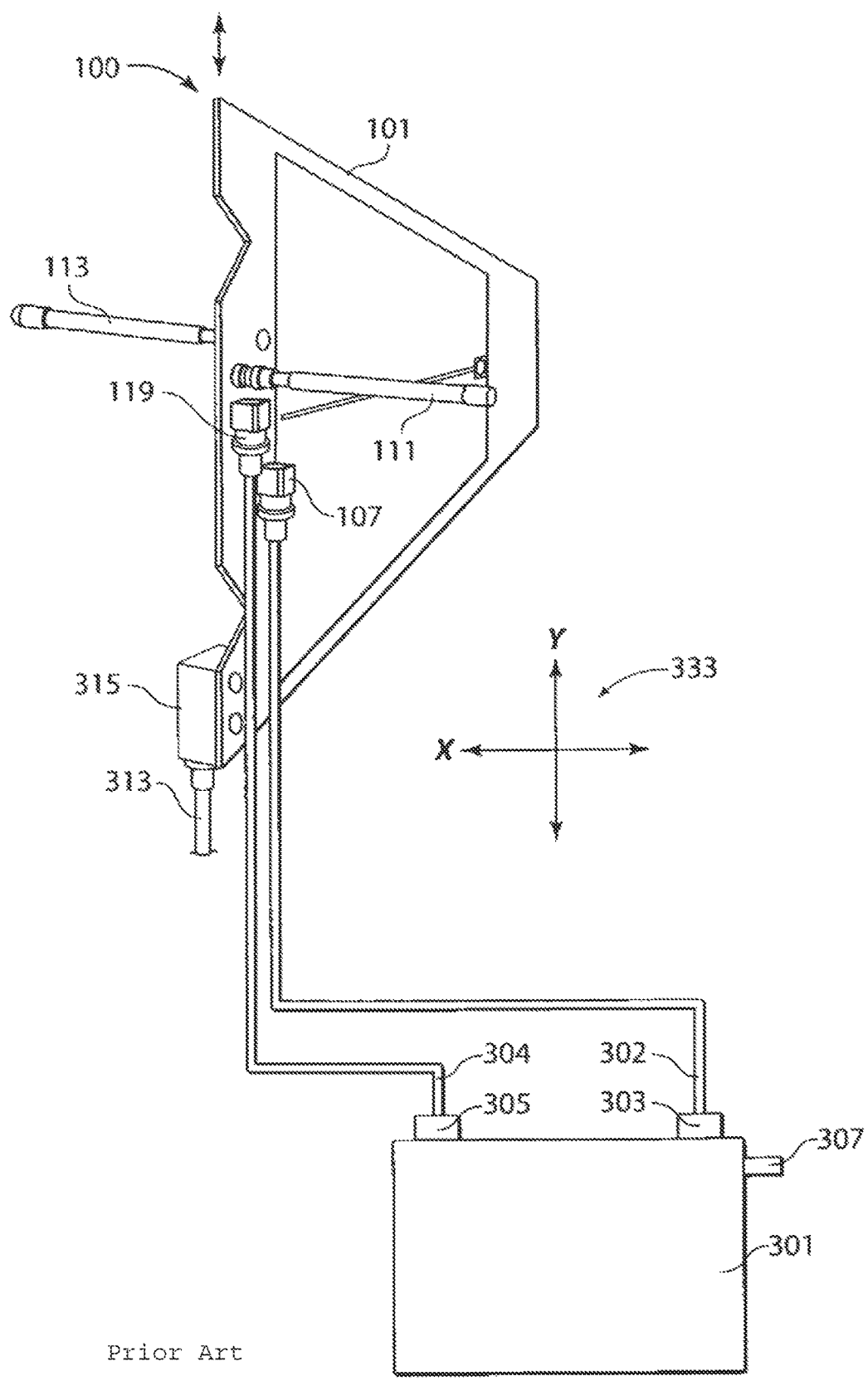
FIG. 3 is a diagram of the connections to the diversity fin antenna, the feed lines, and the connection to a diversity receiver.

Now referring to FIG. 3, a diagram of the connections to the diversity fin antenna 100, the feedlines, and the connection to a diversity receiver 301 is shown. The operation of the diversity fin is enabled as follows: Panel 101 is first mounted on a suitable mast 313 using a block with a tapped hole 315 which is screwed to panel 101. Various stands and attachment schemes can be used, and the panel can be mounted in any position, the "vertical" position shown in FIG. 3 being merely an example. Once mounted, whip antennas 111 and 113 may be extended to a more or less perpendicular position with respect to panel 101. Diversity receiver 301, which may be a typical wireless performance receiver having diversity reception such as for example, a Shure SLX4 Diversity Receiver, or any diversity receiver for any frequency of operation, is then attached via coaxial cables 302 and 304 to antenna ports 305 and 303 on receiver 301. The distal ends of coaxial cables 302 and 304 are connected to independent connectors 107 and 119, thereby connecting in a convenient, fast and sure manner two operable linearly polarized antennas that work in conjunction with each other spaced in a fixed relative position and relative angular position.

Referring again to FIG. 3, the diversity fin antenna 100 is aimed at RF source 333 which may have radiation therefrom at any radial angle such as X, Y, or in between, without concern by the user, since at least one of the two planar axes will always satisfy the condition of not being cross polarized. That is to say, at least one of the two planar axes defined by diversity fin 100 will accommodate and pick up signals if they do arrive in a cross polarized condition, because a perfect undesired cross polarized condition will no longer be produced at both terminals of the diversity receiver 301 when the diversity fin antenna 100 is configured and attached thereto, as shown. This reduces the probability that both elements will see a cross polarized null to a near zero probability. Therefore at least one terminal of receiver 301 will always have a signal received within the preferred plane of at least one of the elements of diversity fin 100, being either from whips 111 and 113, which together form a dipole antenna that is generally perpendicular to panel 101, or from elements 105 in patch 103 that are coplanar and parallel to panel 101.

Figure 4A:
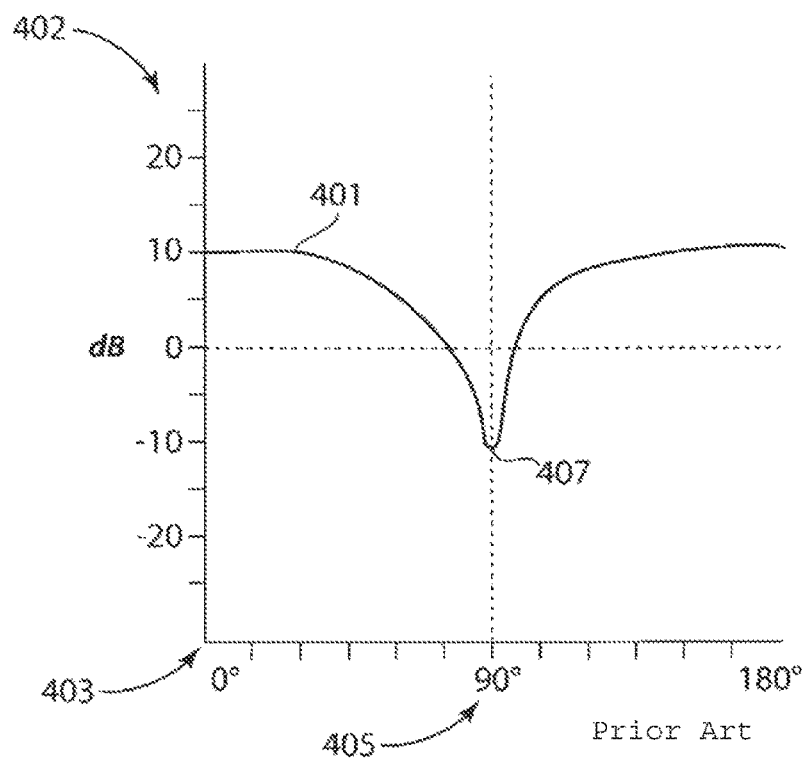
FIG. 4a is a graphic representation of the signal from a single cross polarized antenna response when received from a single linear polarized source, showing an undesired null condition as a function of angle of about 90 degrees.

Referring now to FIG. 4a, a graphic representation of the signal from a single cross polarized antenna response when receiving from a single linear polarized source, showing undesired null condition as a function of angle of about 90 degrees, the shortcomings of using just a single linear polarized antenna and moving source can be appreciated. Signal level as a function of angle 401 may be expressed as decibels on vertical axis 402. Relative angle axis 403 ranges from 0 degrees to 180 degrees. In Particular, 90 degree relative angle 405 can be seen to correspond to signal null 407 which can and often has a signal strength of 20 decibels below the maximum signal strength if it was otherwise oriented.

A loss of 20 decibels is considered to be high, and sufficient to produce a "fade" that can be heard on the received signal as noise.

Figure 4B:
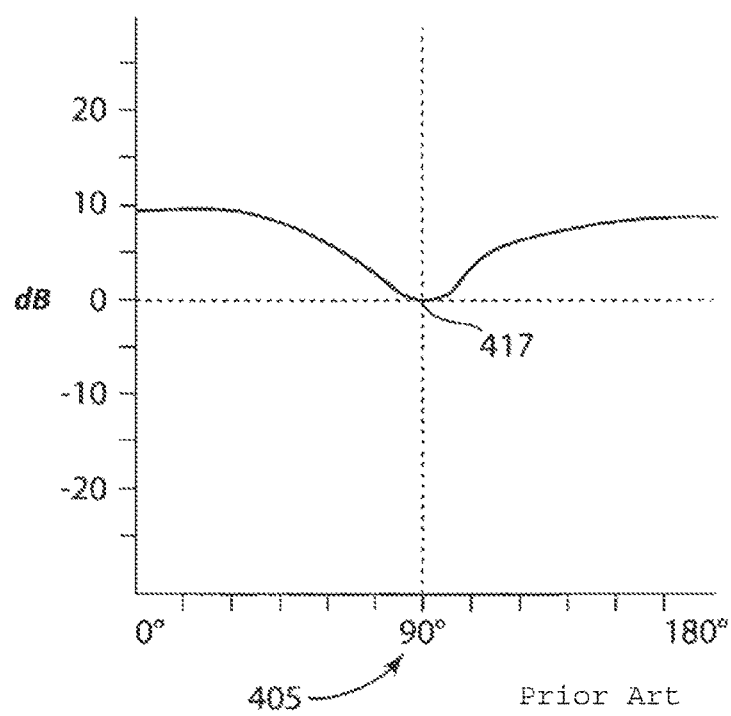
FIG. 4b is a graphic representation of the sum of the signals from two perpendicular antenna elements received from a single linear polarized source, even showing an undesired null condition as a function of about a 90 degree angle with its null depth reduced.

Referring now to FIG. 4b, which shows a graphic representation of the logical sum of the signals from two perpendicular antenna elements receiving from a single linear polarized source, even when undesired null condition as a function of about a 90 degree angle is produced, the sum of the two antennas resulting in a situation with the null depth 417 reduced by a good margin, in the order of 10 decibels. In contrast to the null depth described in FIG. 4a, the performance of the summed signals of FIG. 4b representing the worst case scenario which is a significant and worthwhile improvement in performance, owing to the use of two independent yet relatively fixed, perpendicular, conveniently connectable elements afforded by diversity fin antenna 100 as shown in FIG. 3 in conjunction with diversity receiver 301 also shown in FIG. 3. It should be pointed out that this beneficial relationship between diversity orthogonal element polarization is further afforded by avoiding destructive interference null in addition to avoiding a condition where both axes are subject to a cross polarization null. A destructive interference null is avoided by not having the gain of the orthogonal elements match each other, since one requirement for a destructive cancellation is that the amplitudes match, in addition to being 180 degrees out of phase. Unequal gain on each axis reduces the probability of destructive interference. It can be seen that the likelihoods of a destructive interference null, and of a cross polarization null in the diversity fin antenna 100 are exceedingly small and beneficial to the dropout-free operating of the embodiments. A probabilistically governed diversity fin antenna having an orthogonal relationship between two sets of elements to effectively reduce the probability of a cross polarization null condition simultaneously on both axes, and having a useful gain mismatch between the two orthogonal elements effective to reduce the probability of destructive interference is achieved The following is illustrative of the practical relative probabilities:

In the case of fixed orthogonal elements we first take one linear set of elements. It is known that a cross polarization null requires that the incoming wave and the linear element be at 90 degrees from each other and within a range of about +/−1 degree. Over a possible 360 degrees there are two positions 180 degrees apart that satisfy the condition of a cross polarized null, each having the same 2 degree tolerance window. he probability of a cross polarization null might be estimated at $1/90$ at any single set of linear elements. At the same time, a second set of linear elements in a fixed orthogonal position relative to the first set of elements also carries this same $1/90$ cross polarization null likelihood, independent of the first set of linear elements owing to the unique configuration of the techniques described herein. Therefore the total probability of the diversity fin antenna having a pair of orthogonal sets of elements being in a cross polarization null condition, on both axes at once, is at least $1/90 \times 1/90$, or $1/8{,}100$, which is a reasonably low probability.

In the case of a destructive interference condition it should be understood that multi path propagation serves to produce some likelihood of two equal amplitude waves arriving at one linear element at the same angle yet with one delayed by 180 degrees. If the condition of equal amplitude cannot be met then the chances of a destructive interference condition is reduced. The techniques utilize two sets of mismatched, orthogonally positioned elements that are advantageous to preserving a desirable gain mismatch between each plane, resulting in a lowered probability that equal amplitude 180 degree delayed multi path situation will occur. For the purpose of estimation, it is considered that the useful desired gain range is about 30 db, and that a 2 db mismatch is sufficient to prevent a total destructive cancellation of the signal, and we can expect signals anywhere within that range. Therefore we achieve a $2/30$th ($1/15$) chance of a destructive cancellation null at one set and over two sets, a $1/225$ chance.

In some embodiments, both potential dropout reducing conditions are in effect at all times. The chance of a cross polarization null at $1/8{,}100$ and a destructive cancellation at $1/225$, together, represent a reduced estimated likelihood of a dropout condition to $1/1{,}822{,}500$ which is about 0.00000054% at any given moment.

Figure 5A:
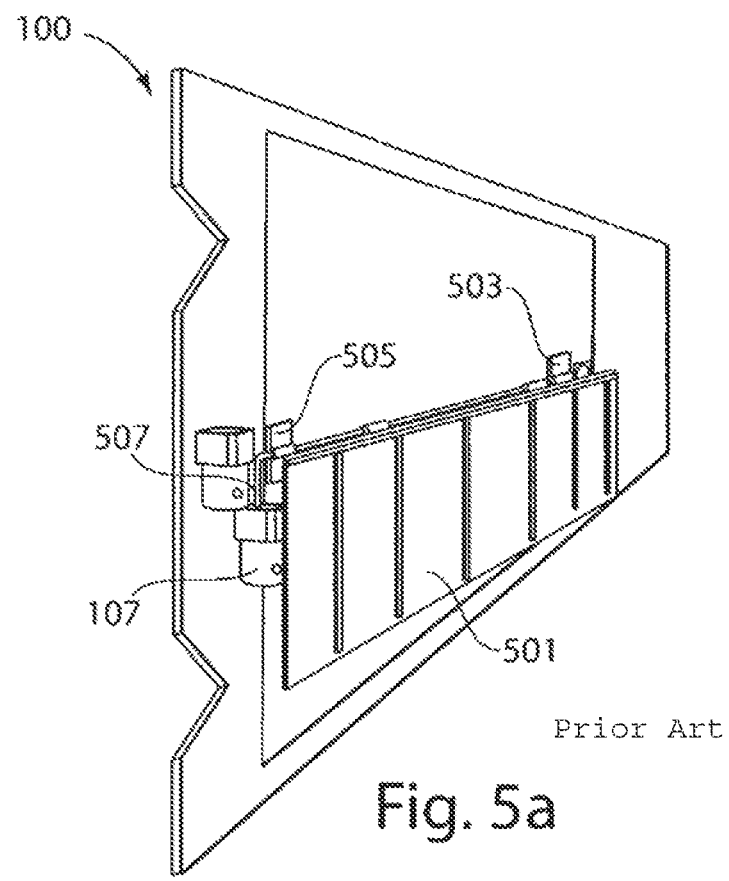
FIG. 5a is a ¾ view of a diversity fin antenna with folded array elements.
Figure 5B:
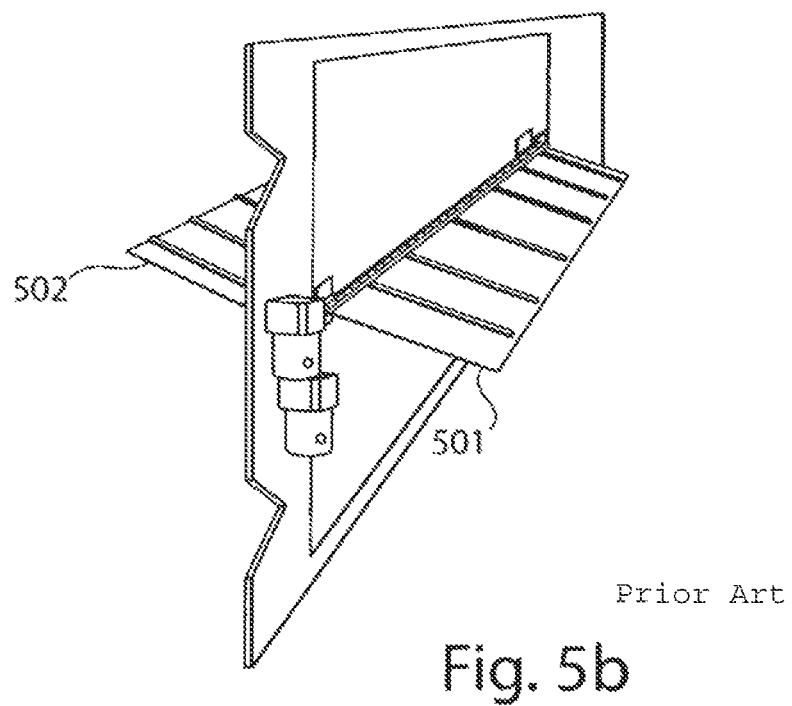
FIG. 5b is a ¾ view of a diversity antenna with extended array elements.

Referring back to FIG. 4b, the depth of null 417 maybe reduced even further, or eliminated altogether, by use of gain elements as depicted in FIG. 5b in conjunction with the system depicted in FIG. 3, thereby eliminating dropouts with one, single, quickly deployable antenna system rather than two separate, costly and time consuming antenna setups.

Referring now to FIG. 5a, a ¾ view of a diversity fin antenna with folded array elements, diversity fin antenna 100 may be equipped with a more complex gain-type array element 501 that may be comprised of a planar, etched circuit board material affixed to panel 101 using electrically conductive hinges 503 and 505, which communicate electrically via trace 507 to connector 107. Hinges 503 and 505 may be friction fitted or be provided with detents (not shown) to provide for some stiffness.

Referring now to FIG. 5b, a ¾ view of a diversity antenna with extended array elements 501, foldable element 501 and its corresponding panel 502 are shown in the extended position on opposite sides of the panel 101, generally perpendicular to it, and yet deployable at will, and easily stored flat for transportation and storage. The use of array elements 501 and 502 provides gain over the dipoles depicted in FIG. 2, nos. 111 and 113.

Figure 5C:
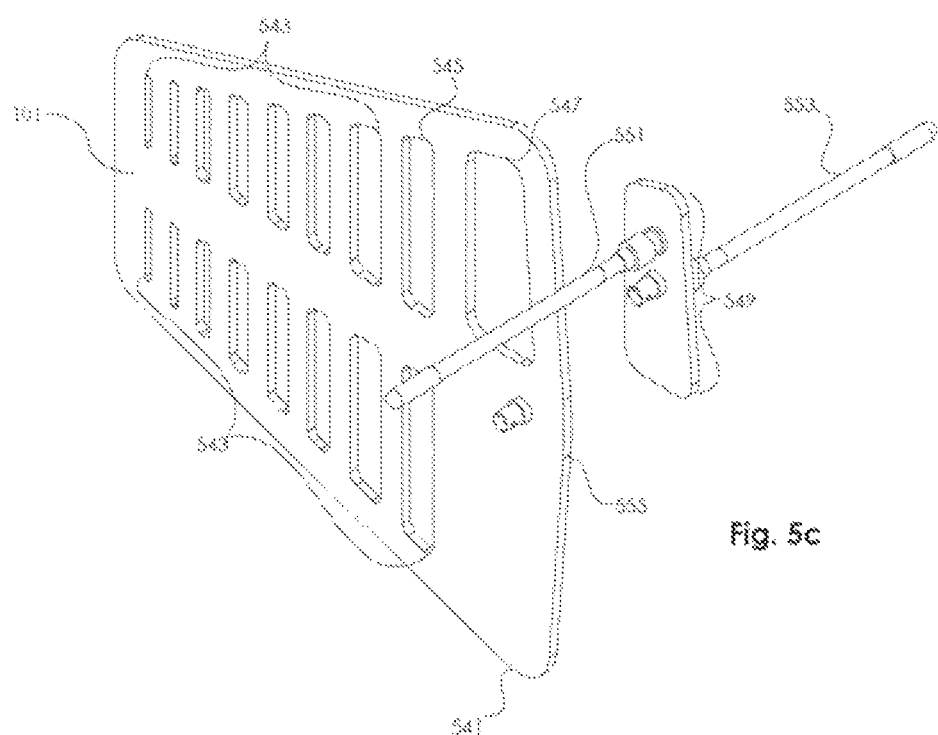
FIG. 5c is a ¾ view of a diversity antenna substrate with apertures.

Referring now to FIG. 5c, a ¾ view of a diversity antenna substrate with apertures shows a weight and wind load-reduced configuration with apertures that may usefully position additional elements such as a dipole array, an electronics box, or a converter. Substrate 541 may be made of a double-sided printed circuit board with apertures 543, 545 and 547 cut into the substrate 541 to reduce weight and wind load. Aperture 547 (or any other apertures sized appropriately) may be used as a socket for a modular subassembly 549 to fit into in a convenient manner. Modular subassembly 549 may consist of another section of shaped circuit board material, or a housing (not shown) similar to the housing that will be shown in FIG. 7c, housing 703 and 704. Returning now to FIG. 5c, substrate 541 may be used as a single log-periodic type dipole array, and modular subassembly may hold a dipole antenna array with elements 551 and 553 extending therefrom. Substrate 541 may be relatively thick owing to the reduced weight of substrate 541 when provided with a foraminous structure. A suitably stiff substrate thickness 555 is about 0.125" or about ⅛ of an inch thickness.

Figure 5D:
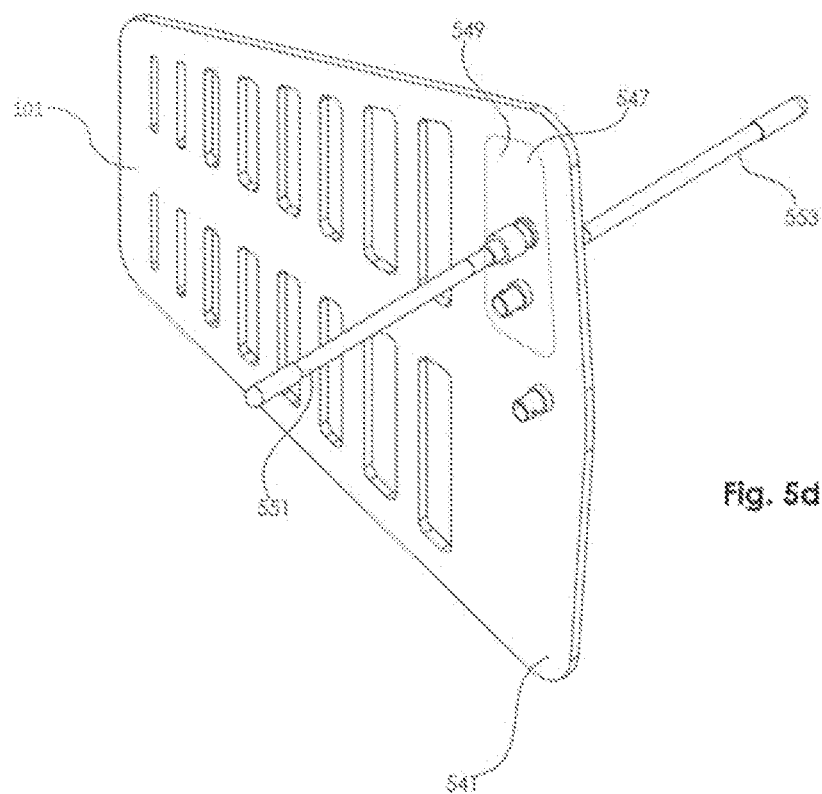
FIG. 5d is a ¾ view of a diversity antenna with a second set of orthogonal elements attachable at an aperture.

Referring now to FIG. 5d, a ¾ view of a diversity antenna with a second set of orthogonal elements attachable at an aperture, aperture 547 is filled in this instance with modular subassembly 549 and may be pressed into place or glued into position, the advantage being that various types and positions of elements on modular subassembly 549 may be tailored to specific frequency ranges, and be equipped with various other components (not shown). Other methods of attachment including but not limited to clips, friction attachments clamps etc., on or in proximity to the generally planar substrate that provide a fixed system of orthogonal elements may be used within the teachings of the techniques described herein, which includes the method of reducing a cross polarization null in a diversity receive antenna system that is central to one object of the techniques described herein.

Figure 5E:
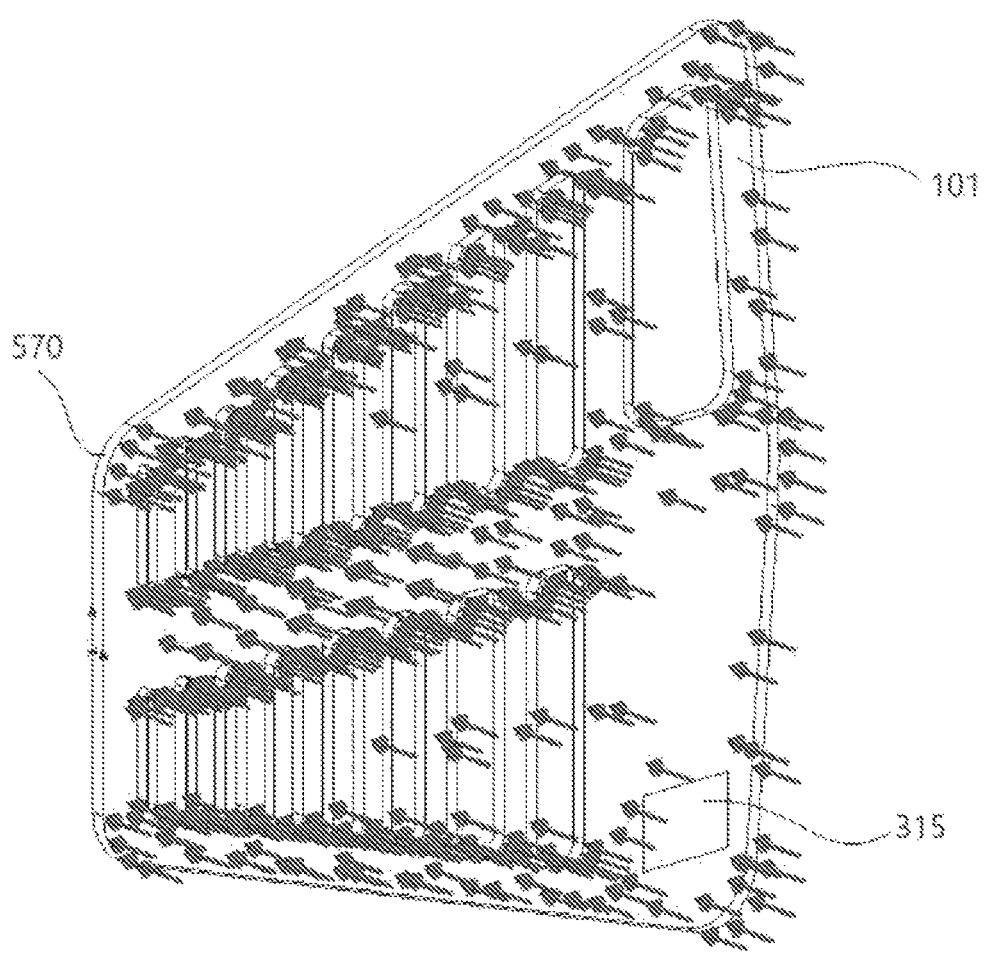
FIG. 5e is a ¾ view of a diversity antenna substrate with apertures and arrows showing pressure applied during finite element analysis.

Referring now to FIG. 5e, the ¾ view of a diversity antenna substrate with apertures and arrows showing pressure applied during finite element analysis, a calculation of the stiffness is done in simulation. A first simulation of static stress and displacement was performed by assuming substrate 101 is fixed at a mounting block location 315 (A) and subjected to an equivalent 15 km/hr wind load perpendicular to the flat plane of substrate 101. The substrate 101 material is fiberglass epoxy, about 0.12" thick as used in multi-layer circuit boards and also log-periodic antennas which has an elastic modulus of about 3,499,760 psi or $2.413 \times 10^{10}$ N/m². This displacement is very small and will reduce the opportunity of the antenna to move, wiggle or vibrate when subjected to wind gusts owing to the stiffness of the material and the use of wind load reducing apertures. The highest displacement "B" 570 is about 0.3 mm, +/−10%. The modeled average pressure on the substrate is 146,000 N/m², and a peak pressure of 878,374 N/m² at a location corresponding to block location 315.

Figure 5F:
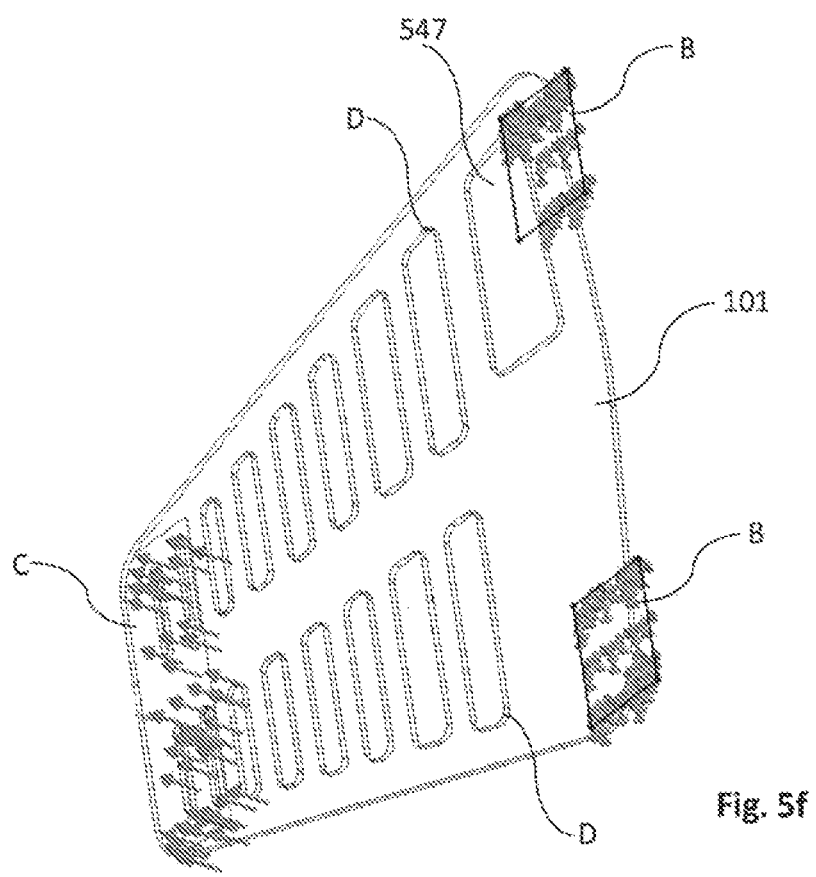
FIG. 5f is a ¾ view of a second simulation of a bending analysis of a diversity fin antenna.

Referring now to FIG. 5f, a second simulation was performed using the cantilever beam method. The substrate which as the same material properties and dimensions as above, is affixed with two clamps (B) spaced apart and at equally spaced locations at the large parallel end of the trapezoid. Mass (C) having a dimension of 1.5×1.5×5" having a mass of 1.417 kg is placed on the horizontal distal end extending from the clamps. The deflection at the distal end is about 2.092 mm. The maximum stress is about 60,848,992 N/m² around the nearest apertures (D). Without large aperture 547, the deflection is 1.795 mm and the maximum stress 52,441,268 N/m².

It is recognized that antenna systems as described herein may be used indoors or out of doors, and therefore subjected to rain. Rain on free space elements used in wire type antennas (not shown) has little effect. The coating of water on a planar fin type antenna is more pronounced, having a significant detuning effect and reduction of operating efficiency relative to the extended dipole antenna. In addition, the touching of other objects such as poles, stage equipment and crossing lines are common in performance venues and tend to adversely affect bare or painted shark fin type antennas as commonly used today such as the Lectrosonics ALP500 LPDA Shark Fin Style Antenna. On-board electronics are best shielded from water which could cause corrosion, short circuits or other damage.

Figure 6A:
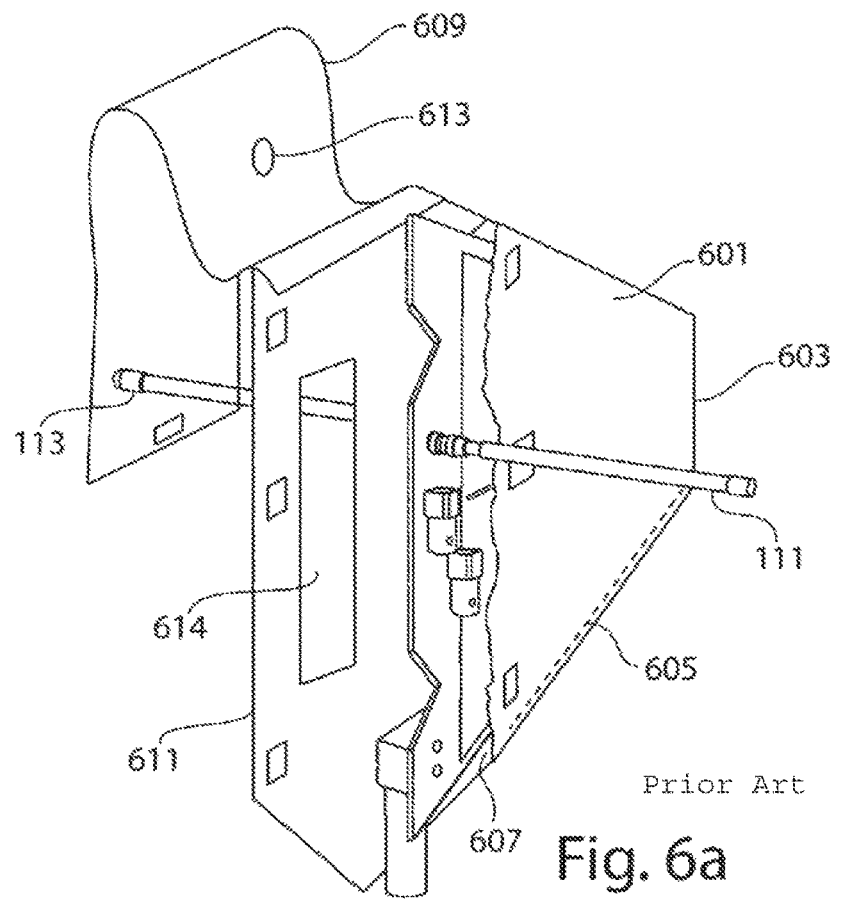
FIG. 6a is ¾ view of a dielectric air space hood for a diversity antenna with movable whip elements, with the hood shown in an open position.

Referring now to FIG. 6a, there is shown a ¾ view of a dielectric air space hood for a diversity antenna with foldable whip elements 111 and 113 solves the problem of touching objects and rainwater detuning by providing an air space between the wet surface and the flat panel of the antenna patch. Hood 601 may be made of rubberized canvas material having a closed end 603, a tapered sewn edge 605 and an open end 607. Flap 609 and cover 611 allow ready attachment of cables (not shown) to connectors, and may be held in place using hook and loop fasteners for quick deployment. Aperture 613 permits ready connection and extension of whip 111. Aperture 613 may be extended to form a slit, if desired. Second aperture 614 may be provided to gain easy access to connectors.

Figure 6B:
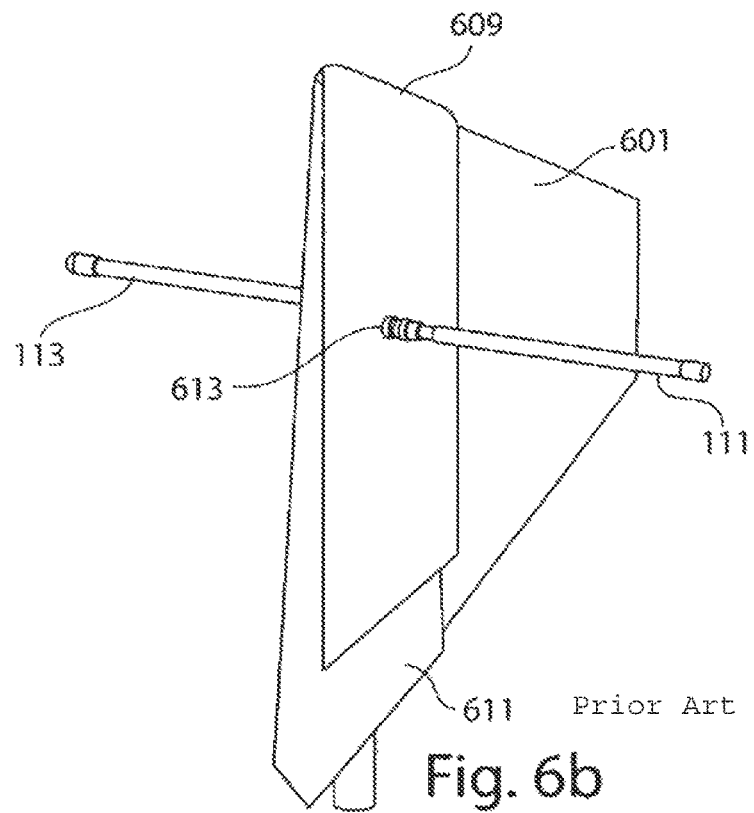
FIG. 6b is a ¾ view of a dielectric air space hood for a diversity antenna with movable whip elements, with the hood shown in a closed position.

Now referring to FIG. 6b, the hood 601 is so effective at regulating the operation of planar antennas that it could be left in place at all times, protecting the electrical components, thereby reducing the need for rubberized or epoxy painted conformal coatings, which are lossy at RF frequencies, and thus keeping rough or sharp edges from persons who may be injured by a falling, uncovered antenna. Flap 609 and cover 611 fold together to form a reasonably water resistant covering with an aperture 613 permitting the attachment of whip antennas 111 and 113 while maintaining performance. A further advantage of the dielectric air space hood 601 provides for user selectable colors, indicia, advertising, and easy machine wash cleaning.

The diversity fin antenna thus described is uniquely suited to convenient, compact, onestep set up and deployment yet with a very high probability of obtaining a consistent signal and a very low probability of a dropout condition in the overall antenna. It would be desirable if the unique co-location of diversity elements and their desirable properties could be used at distances greater than afforded by relatively lossy coaxial cables.

Figure 7A:
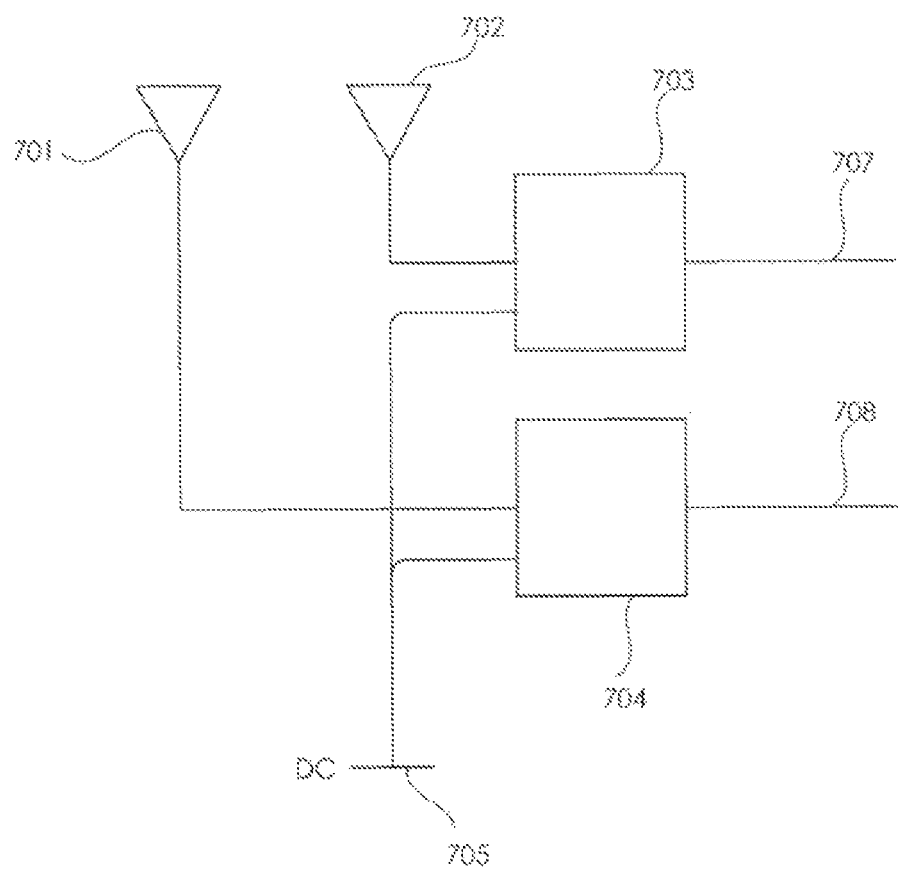
FIG. 7a is a block diagram of an RF over fiber system that is optimally configured with a diversity fin antenna.

Referring now to FIG. 7a, a block diagram of an RF over fiber system that is optimally configured with a diversity fin antenna, co-located antennas 701 and 702 are shown normally connected each to a converter box 703 and 704. Power from DC bus 705 energizes a circuit that modulates a locally-generated optical signal with the incoming RF signal from antennas 701 and 702, that is superimposed onto the optical signal (e.g., via a heterodyne method) and sent out over pair of fiber optic lines 707 and 708. Each channel is used in a diversity reception environment here consisting of both vertical and horizontal components as afforded by the orthogonal juxtaposition of receiving elements as taught generally herein.

Referring now to FIG. 7b, a more detailed block diagram of the RF over fiber system with feedback and inline filtering, one channel of RF energy is shown at shielded entry point 711 through the RF shield of conductive enclosure 713 which surrounds the sensitive electronics circuit 715 contained therein. RF amplifier 717 is fed with low level RF having a range of −150 dbm to about −20 dbm. Stronger signals than −20 dbm can overload the amplifier 717, which has a broadband response from below 100 MHz to above 1000 MHz. The amplified RF signal at the output of amplifier 717 is then connected to a plurality of switchable passband filters 719 and 721 before being injected into the laser diode 723. A feedback amplifier 725 senses the current at laser diode 723 and provides negative feedback to RF amplifier 717 to limit its range to within the linear operating range of the device. Passband filters 719 and 721 may be selectively switched into an on or off state via logic line 727 which is connected to a further CPU (not shown). A person of skill will appreciate that other aspects of the laser diode 723 may be sensed in place of, or in addition to, current, such as the fluence of the laser diode. A person of skill will also appreciate that other types of feedback may be provided instead of negative feedback, such as positive feedback.

Figure 7C:
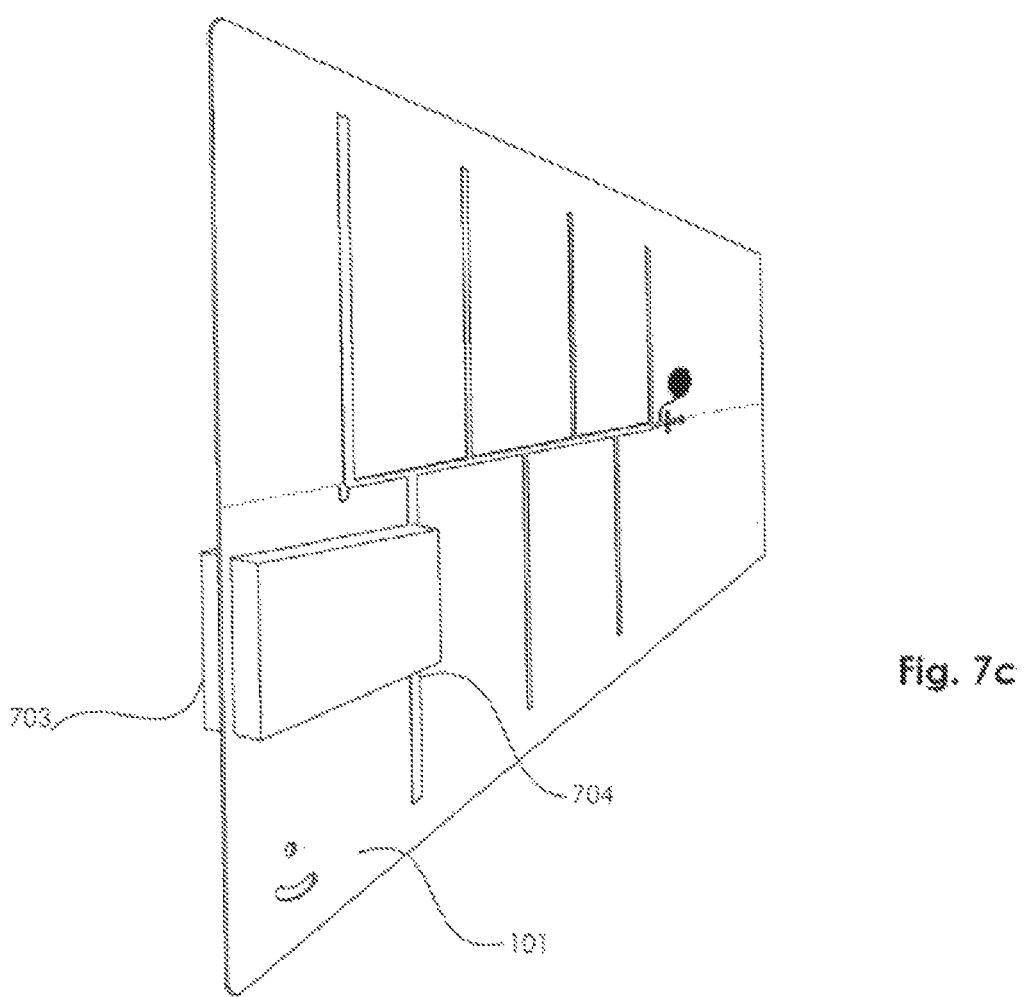
FIG. 7c shows a pair of RF over fiber modules packaged for use with the diversity fin antenna and mounted thereto.

Referring now to FIG. 7c, a pair of RF over fiber modules packaged for use with the diversity fin antenna and mounted thereto, antenna substrate panel 101 is fitted with converter boxes 703 and 704 mounted back-to-back, which reduces crosstalk. The RF over fiber conversion system shown in FIGS. 7a, 7b and 7c maintain channel separation and have little sharing of components, and require two fiber optic lines to be connected to the diversity fin antenna.

Figure 7D:
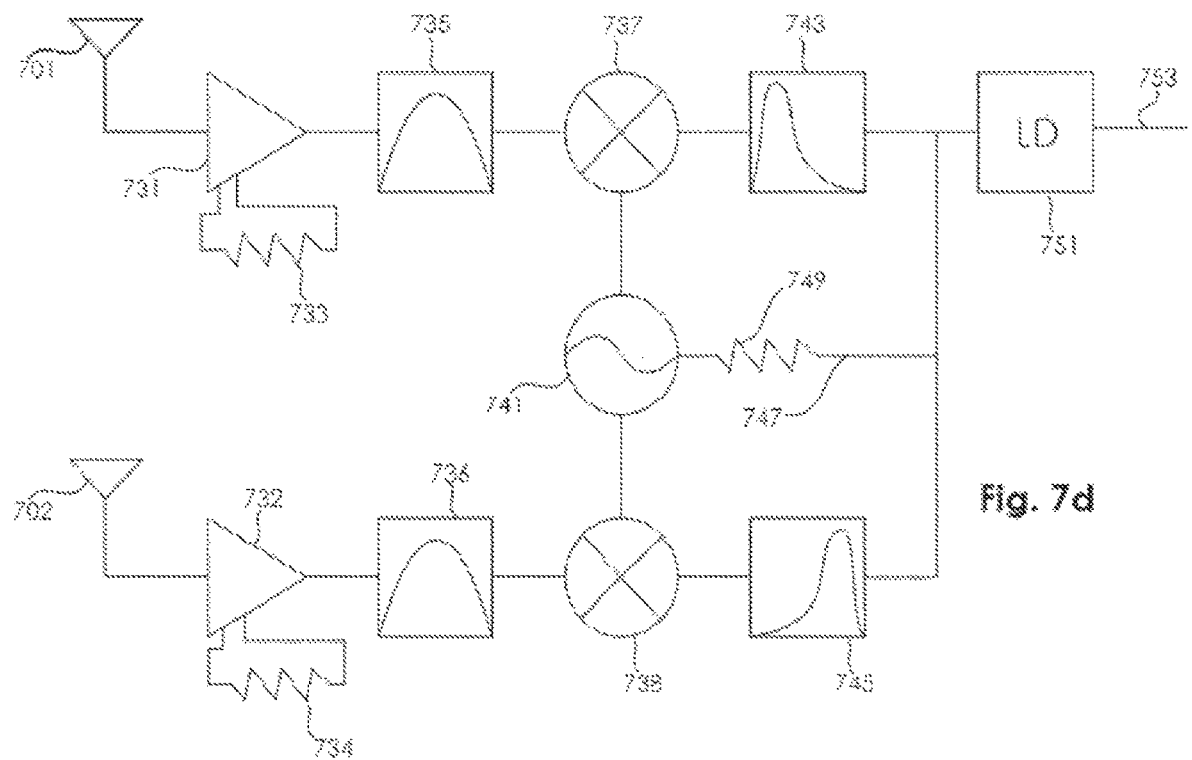
FIG. 7d is a conversion scheme using up and down conversion of the RF signal prior to transmission over an optical line.

FIG. 7d, the block diagram of a conversion scheme using up and down conversion of the RF signal prior to transmission over an optical line, shows how this aspect can be used to eliminate the need for two optical lines. Co-located antennas 701 and 702 are amplified with tuned amplifiers 731 and 732, which are gain and noise figure optimized for the desired frequency range, which for the purpose of the techniques described herein can be illustrated as the 500 to 600 MHz band. Having amplifier gain optimized permits gain matching of the vertical and horizontal signals which may be different due to gain characteristics of the log-periodic type antenna vs the so-called "whip" antenna. Adjusting the RF gain relationships of the working elements affords a greater control of the antenna range, performance, and resistance to dropouts. In practice the RF gain disparity is small and can be ignored since diversity receive systems vote for the channel with the highest signal level and lowest noise, and additionally the intentional mismatch of gain reduces the number of switching events which may cause noise, owing to the small imbalance of the RF energy from the log-periodic section, which has higher gain, vs the dipole array, which has lower gain. In RF over fiber it is more desirable and possibly necessary to gain match channels within the optical domain. A typical gain adjustment is made by use of fixed resistors 733 and 734 which set the amplifier gain according to the resistance value chosen. Gain may be adjusted by the use of a variable potentiometer (not shown) in place of resistors 733 and 734 if gain needs to be adjusted at the board level frequently. Still referring to FIG. 7d, amplified RF from each amplifier is fed into identical narrow band pass filters 735 and 736 each limiting signals to a specific range of frequencies with high attenuation outside those frequencies. For the purpose of illustration a range of 500 MHz to 600 MHz is used. The filtered signal then passes into individual mixers 737 and 738. The type of mixer can be a double balanced mixer which has good port isolation and also a high dynamic range and low harmonics. Both mixers 737 and 738 are fed with one local oscillator 741 which is a high quality sine wave oscillator that is preferably crystal controlled. For the purpose of illustration a local oscillator frequency of 100 MHz is used though it should be understood that other local oscillator frequencies may be used.

A mixer will output the sum and difference between the local oscillator frequency and the incoming RF frequency or band of frequencies. Both sum and difference are present at the mixer output but usually radio receiver designers filter out one or the other. In the embodiments described herein, both sum and difference frequency components are used in a selective manner to accomplish the objective of carrying two channels of one frequency band over a single modulated optical fiber modulated with a simple RF amplifier and laser diode arrangement. Relative phase is preserved by the use of a common local oscillator and mixer and one resulting mixed produce can be inverted if needed to prevent the two results from occurring 180 degrees out of phase, depending on the mixer type used.

Referring still to FIG. 7d, the sum and difference frequency bands that result from the use of a 100 MHz local oscillator 741 when mixed with a frequency range of 500 to 600 MHz is 500 to 600 MHz and 600 to 700 MHz. Second stage bandpass filter 743 may therefore have a selected passband of 500 to 600 MHz. Second stage bandpass filter 745 may have a selected passband of 600 to 700 MHz. It can be seen that we have taken a 500 to 600 MHz band and split it into two different but separate bands each separated by 100 MHz in this instance. Local oscillator 741 100 MHz signal is used to convert and control both bands, with the advantage that slight drifts of the local oscillator will equally affect both bands. The local oscillator output is therefore important and used again as a pilot or reference signal over signal line 747 after being attenuated by resistor 749 and fed into laser diode 751 simultaneously with the filtered outputs of bandpass filters 743 and 745 with the result that two distinct bands of information may be non-interferingly carried on the modulated laser diode 751 signal with the local oscillator output also being present and capable of being referred to where needed, out through single fiber optic line 753.

Figure 7E:
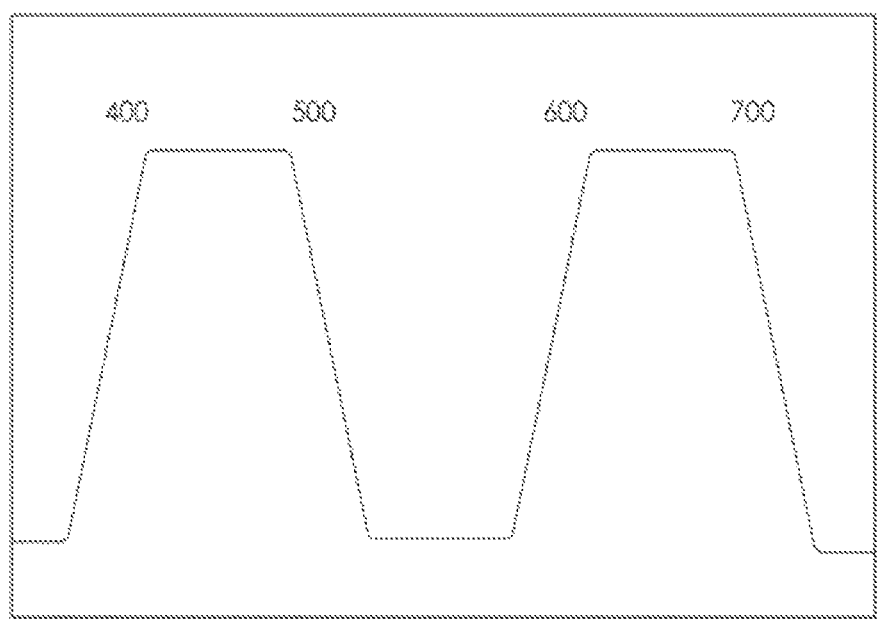
FIG. 7e is diagram of one possible resulting spectrum from the conversion scheme showing the passband reassigned to a plurality of frequency segments.

FIG. 7e is a diagram of one possible resulting spectrum from the conversion scheme showing the passband reassigned to a plurality of frequency segments, when the steps in FIG. 7d are carried out. Referring now again to FIG. 7e, each of the two co-located antennas are now shown to have their outputs converted via heterodyne method to a higher and a lower band separated by the local oscillator frequency. Referring back again to FIG. 7d, it can be appreciated that both signal bands can be injected into to modulate laser diode 751 and remain distinct and separable at the receiving converter end.

Figure 8:
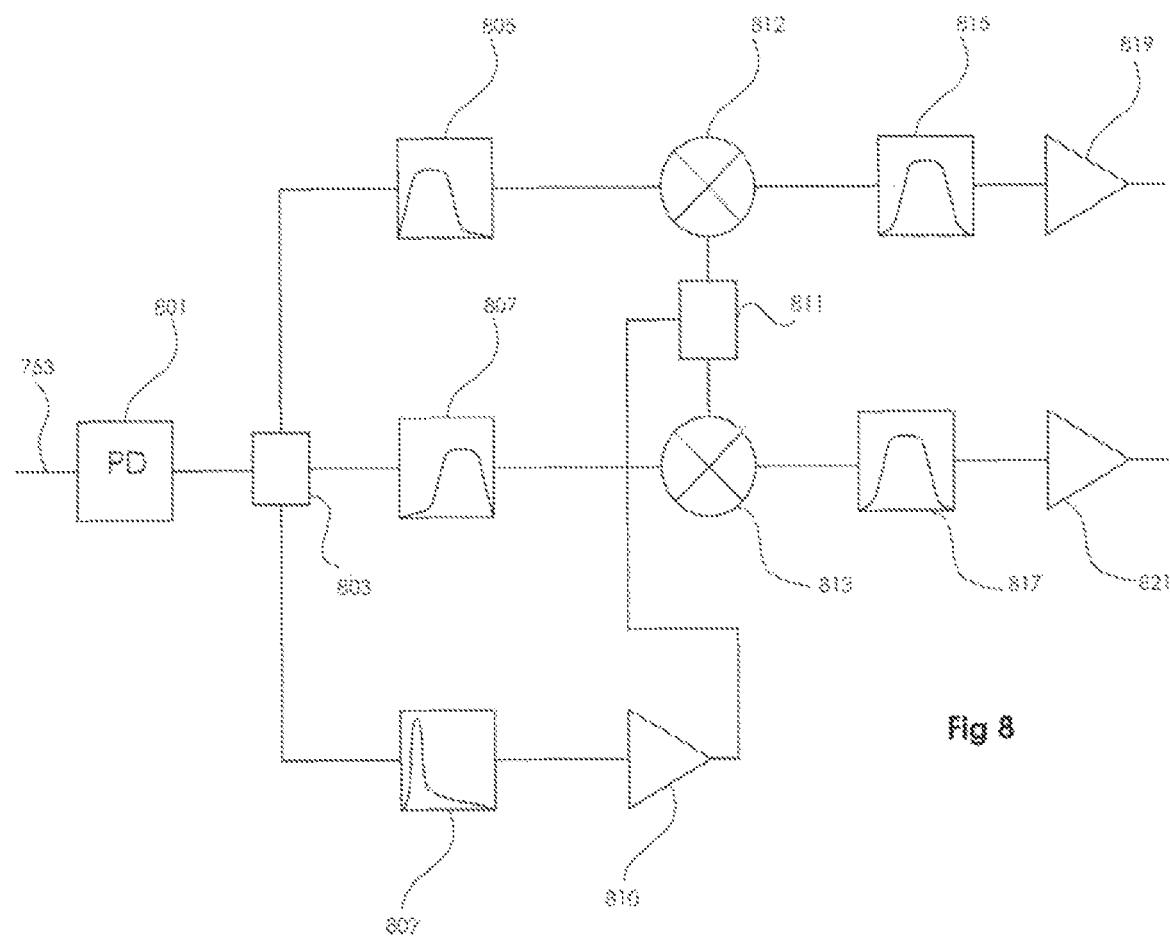
FIG. 8 is a block diagram of an optical receiving converter for converting a modulated lightwave signal having frequency spaced channels into a pair of matched frequency RF channels for use by a conventional diversity receiver.

FIG. 8, is the block diagram of an optical receiving converter for converting a modulated lightwave signal having frequency spaced channels into a pair of matched frequency RF channels for use by a conventional diversity receiver. Fiber optic line 753 from the laser diode 751 of FIG. 7d is connected to receive photodiode 801 of FIG. 8 which has an RF output that is divided by three-way divider 803 and then into separate band pass filters 805, 807 and 809. For the purpose of illustration, bandpass filter 805 has a passband of 400 to 500 MHz which represents the "down" converted signal. Bandpass filter 807 has a passband of 600 to 700 MHz which represents the "up" converted signal. Band pass filter 809 has a very narrow passband centered on 100 MHz which is the local oscillator reference signal or pilot signal. Filter 809 is followed by amplifier 810 which boosts only that reference or pilot signal to a level that is used by 2-way power divider 811 and feeds into separate mixers 812 and 813 simultaneously. Outputs of mixers 812 and 813 which still have remnants of the 400 to 500 MHz and 600 to 700 MHz signals are each individually filtered at filters 815 and 817 to have identical passbands of 500 to 600 MHz, amplified if needed by amplifiers, but otherwise identical in frequency, amplitude and phase to the original signals prior to optical conversion and frequency band reassignment. The two signals are virtually identical to those that would be produced by a pair of coincident elements cross polarized and used in a probabilistic manner to assure at least one of the two inputs to a given receiver are never exposed to a cross polarization null result.

It should be recognized by those skilled in the art that a variation of the conversion scheme may include one in which a single RF line is used to interconnect the transmitting and receiving sections using essentially the same RF band reassignment techniques with a single local oscillator but with coaxial cable instead of optical cable. Having a single line do the work of two lines is advantageous, in both the RF and the optical domains.

It has been found that utilizing and sharing one local oscillator to produce two transmittable band segments of a two channel pair that are restored at the receive end using the same local oscillator results in perfect frequency alignment, no beating or cancellation, and excellent channel separation using the techniques described herein. It is recognized that wavelength division multiplexing using a plurality of optical wavelengths to distribute multiple channels of information is an available technology but often has a cost that exceeds the embodiments described herein as the optical components for wavelength division multiplexing and demux are relatively high in cost. The embodiments can use much less costly components; Laser diodes capable of amplitude modulated operation up to 2 GHz are available for less than $25, for instance, and simple photodiodes capable of demodulating an AM optical carrier are also readily available, inexpensive, and simple to implement.

Even greater ease of use, cost savings and reduced noise artifacts can be afforded by additional electronics on board the diversity fin antenna, owing to the advantage of co-located yet independent diversity elements.

The probabilistic diversity fin antenna system thus described with additional components is especially well suited for the application as it has adequate planar space for circuitry, dual, co-located polarization, and is compact, light and portable.

When using the heterodyne techniques discussed above, a person of skill will appreciate that there is typically no latency in the analog circuitry except that required for the propagation of the signal through the system itself. The subject matter described herein can therefore be implemented using the analog techniques described above. These techniques may also be implemented in digital electronic circuitry, or in computer software, firmware, or hardware, including the structural means disclosed in this specification and structural equivalents thereof, or in combinations of them. Doing so may be less desirable, due to an increased latency depending on the implementation. If such latency delays are tolerable for the particular application, then the techniques can be implemented as such. The subject matter described herein can therefore further be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. The computer program can include, for example, web application software, scanning software, RF data analysis software (e.g., including the frequency allocation and intermodulation program), and user interface software. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers 115 at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processor of any kind of digital computer. Generally, a processor receives instructions and data from a read only memory or a random access memory or both. The essential elements of a computer are a processor for executing instructions and one or more memory devices for storing instructions and data. Generally, a computer also includes, or is operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

The components of the system can be interconnected by any form or medium of digital data communication, e.g., a communication network. Examples of communication networks include a local area network ("LAN") and a wide area network ("WAN"), e.g., the Internet.

It is to be understood that the embodiments are not limited in its application to the details of construction and to the arrangements of the components set forth in the following description or illustrated in the drawings. The embodiments are capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the embodiments. It is important, therefore, that the claims be regarded as including such equivalent constructions insofar as they do not depart from the spirit and scope of the embodiments.

Although the embodiments have been described and illustrated in the foregoing exemplary embodiments, it is understood that the present disclosure has been made only by way of example, and that numerous changes in the details of implementation of the embodiments may be made without departing from the spirit and scope of the embodiments, which are limited only by the claims which follow.

The invention claimed is:

1. A diversity antenna system for connection to a distant receiver system, the diversity antenna system comprising:
   (a) a first antenna associated with a first channel, the first antenna being adapted to detect radio frequency (RF) energy radiating along a first plane and produce a first analog signal in response thereto;
   (b) a second antenna associated with a second channel which is distinct from the first channel, the second antenna being adapted to detect radio frequency (RF) energy radiating along a second plane orthogonal to the first plane and produce a second analog signal in response thereto;
   (c) an oscillator for generating an oscillating electronic signal;
   (d) a first mixer for adding the oscillating electronic signal to the first analog signal to yield a first mixed signal;
   (e) a second mixer for subtracting the oscillating electronic signal from the second analog signal to yield a second mixed signal; and (f) a laser diode in communication with the oscillator, first mixer and second mixer for modulating a single optical output signal which includes the first and second mixed signals in distinct frequency channels within a common frequency band.

2. The system as claimed in claim 1 further comprising a first bandpass filter in communication with the first mixer for restricting the frequency band of the first mixed signal delivered to the laser diode to the first channel.

3. The system as claimed in claim 2 further comprising a second bandpass filter in communication with the second mixer for restricting the frequency band of the second mixed signal delivered to the laser diode to the second channel.

4. The system as claimed in claim 3 wherein the oscillating electronic signal is of a first frequency.

5. The system as claimed in claim 4 wherein the first and second channels in the single optical output channel are separated in frequency spread by at least the first frequency.

6. The system as claimed in claim 3 wherein the first antenna exhibits a first gain and the second antenna exhibits a second gain which is different from the first gain.

7. The system as claimed in claim 6 further comprising a first amplifier for amplifying the first analog signal.

8. The system as claimed in claim 7 further comprising a second amplifier for amplifying the second analog signal.

9. The system as claimed in claim 3 further comprising an optical receiving converter in communication with the laser diode for demodulating the single optical output signal into a demodulated signal and separating the demodulated signal back into the first and second analog signals.

10. The system as claimed in claim 9 wherein the optical receiving converter, comprises:
(a) a photodiode in communication with the laser diode for demodulating the single optical output signal into a demodulated signal;
(b) a signal divider in communication with the photodiode for splitting the demodulated signal into three RF signals;
(c) a first bandpass filter in communication with the signal divider for restricting a first of the three RF signals to the frequency band of the first channel;
(d) a second bandpass filter in communication with the signal divider for restricting a second of the three RF signals to the frequency band of the second channel; and
(e) a third bandpass filter in communication with the signal divider for restricting a third of the three RF signals to a passband centered on the oscillating electrical signal.

11. A method for transmitting discrete antenna feeds supplied from first and second antennas over a single optical cable, the first antenna being adapted to detect radio frequency (RF) energy radiating along a first plane and produce a first analog signal in response thereto, the second antenna being adapted to detect radio frequency (RF) energy radiating along a second plane orthogonal to the first plane and produce a second analog signal in response thereto, the method comprising the steps of:
(a) generating an oscillating electronic signal;
(b) adding the oscillating electronic signal to the first analog signal to yield a first mixed signal;
(c) subtracting the oscillating electronic signal from the second analog signal to yield a second mixed signal; and
(d) modulating a single optical output signal which includes the first and second mixed signals for transmission on the single optical cable.

12. The method as claimed in claim 11 further comprising the step of, prior to the modulation step, restricting the frequency band of the first mixed signal to a first frequency channel.

13. The method as claimed in claim 12 further comprising the step of, prior to the modulation step, restricting the frequency band of the second mixed signal to a second frequency channel which is distinct from the first frequency channel.

14. The method as claimed in claim 13 further comprising the step of, after the modulation step, demodulating the single optical output signal into a demodulated signal, separating the demodulated signal into first and second RF signals, and restricting the first and second RF signals to the first and second frequency channels using an optical receiving converter in communication with the laser diode.

15. An optical receiving converter for use with a diversity antenna system through a single fiber optic line, comprising:
(a) a photodiode for receiving an optical signal and demodulating the optical signal into a demodulated signal;
(b) a signal divider in communication with photodiode for splitting the demodulated signal into three radio frequency (RF) signals;
(c) a first bandpass filter in communication with the signal divider for restricting a first of the three RF signals to a first frequency channel;
(d) a second bandpass filter in communication with the signal divider for restricting a second of the three RF signals to a second frequency channel;
(e) a third bandpass filter in communication with the signal divider for restricting a third of the three RF signals to a passband centered on an oscillating electrical signal;
(f) a first mixer in communication with the first and third bandpass filters to yield a first mixed output signal;
(g) a second mixer in communication with the second and third bandpass filters to yield a second mixed output signal; and
(h) a pair of amplifiers to conduct the first and second mixed output to separate inputs of an RF diversity receiver.

16. The optical receiving converter as claimed in claim 15 wherein the oscillating electrical signal is obtained from a distant transmitter.

* * * * *